Oct. 31, 1933. W. A. STEVENS 1,933,231
CONTROLLING REGENERATION IN ELECTRICALLY PROPELLED VEHICLES
Filed Aug. 6, 1931 4 Sheets-Sheet 1
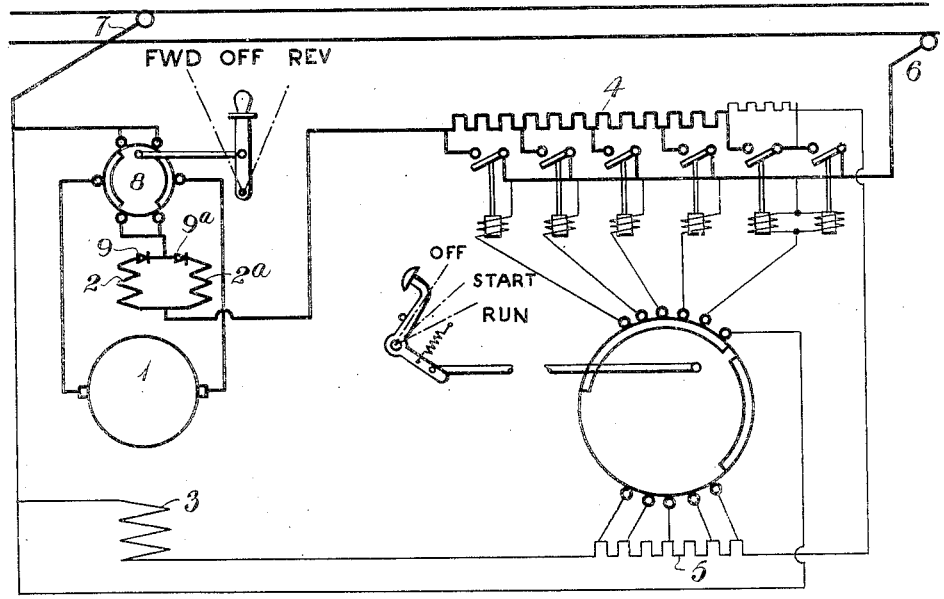
Fig:1.
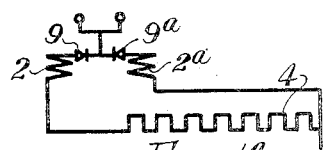
Fig:1ª.
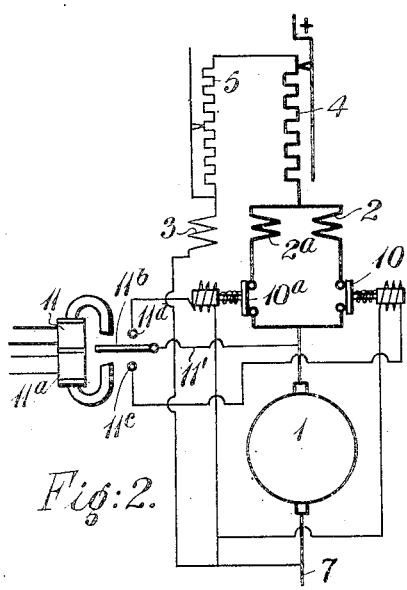
Fig:2.
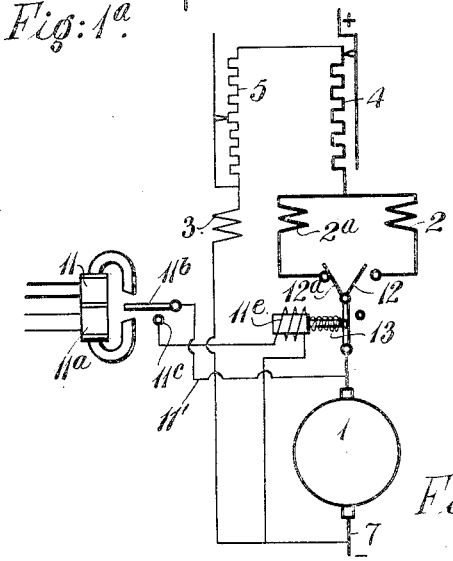
Fig:3.
INVENTOR
William A. Stevens
by Richard E. Babcock
Attorney

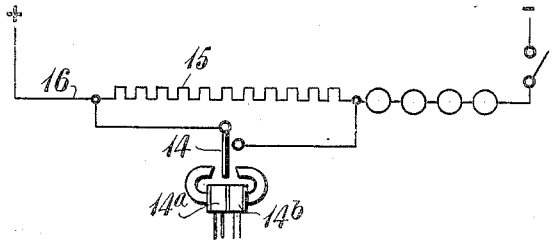
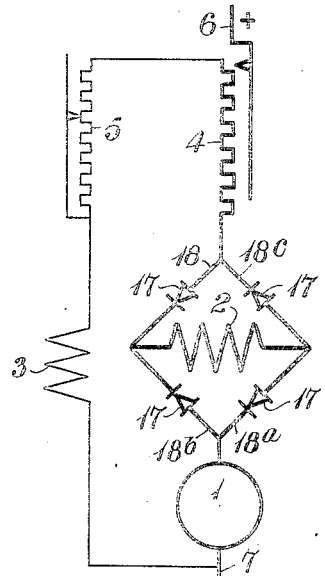
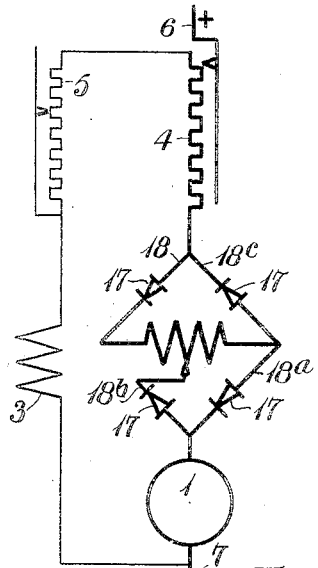
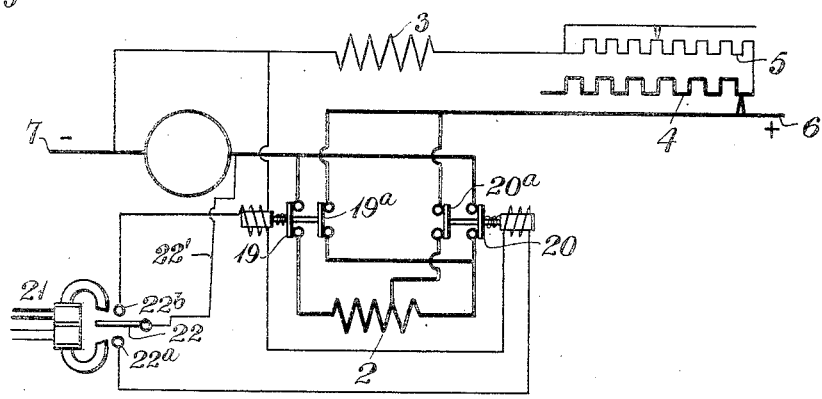

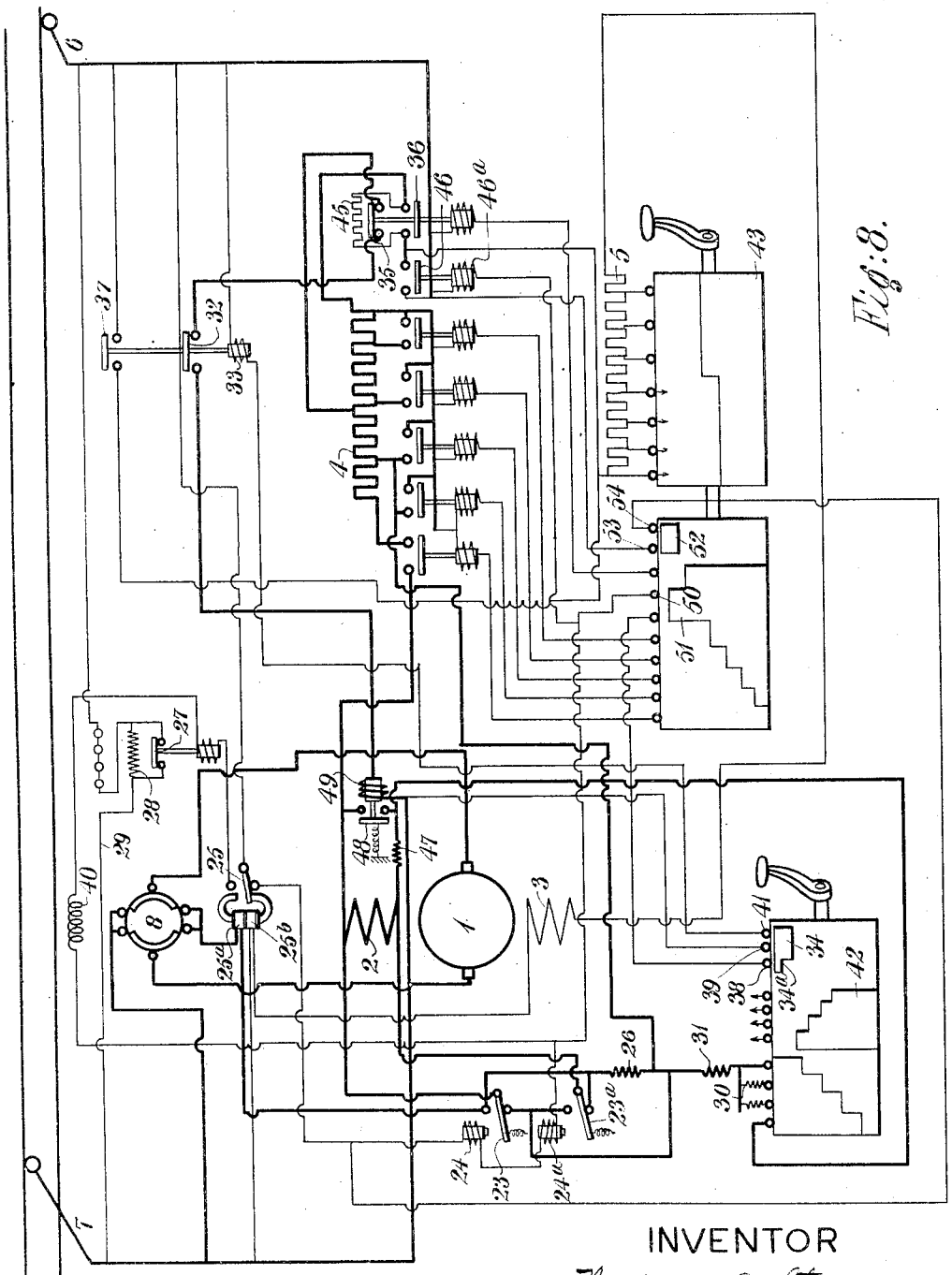

Oct. 31, 1933.                  W. A. STEVENS                  1,933,231
           CONTROLLING REGENERATION IN ELECTRICALLY PROPELLED VEHICLES
                          Filed Aug. 6, 1931         4 Sheets-Sheet 4
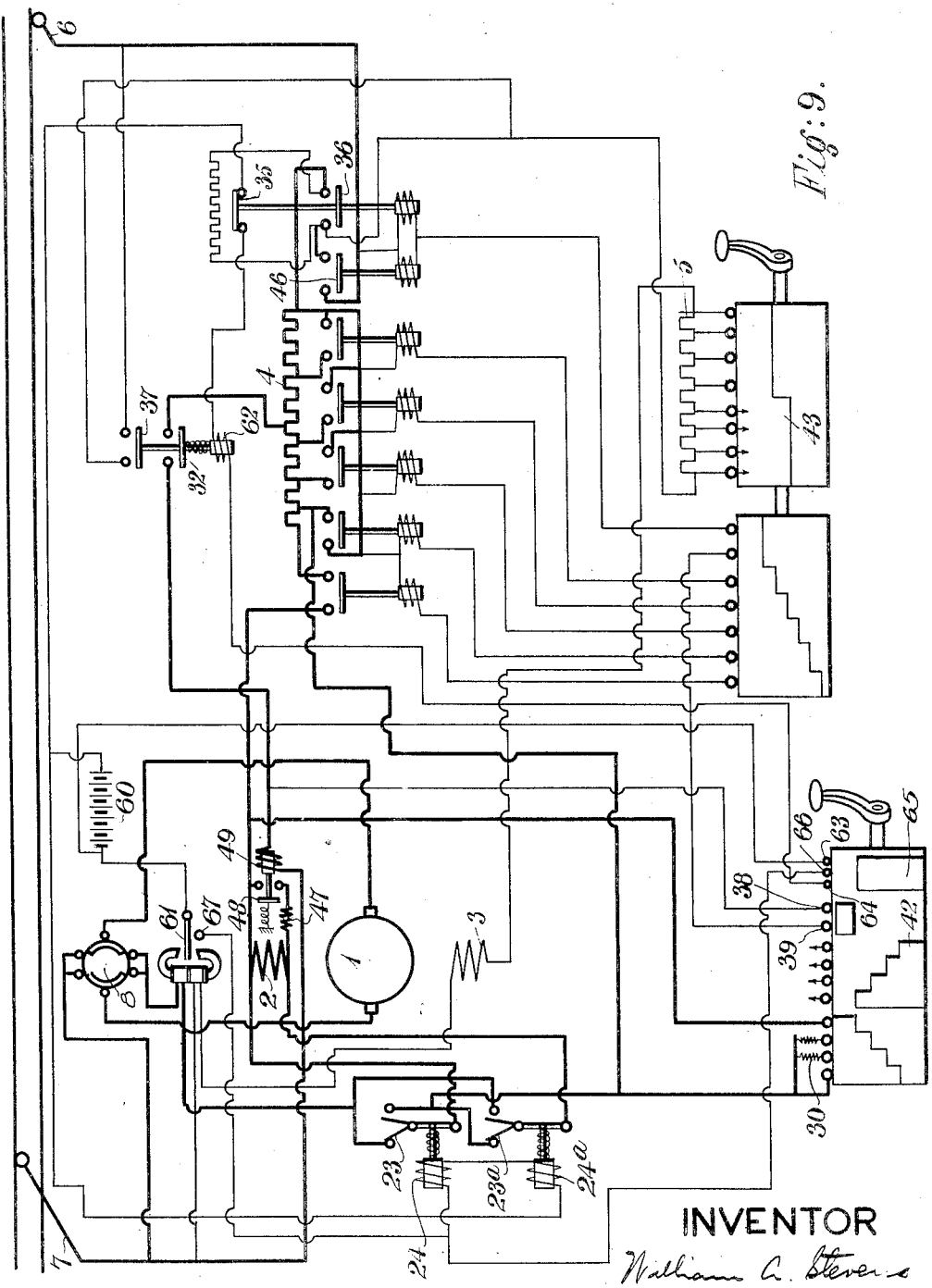
INVENTOR Patented Oct. 31, 1933

1,933,231

UNITED STATES PATENT OFFICE 1,933,231

CONTROLLING REGENERATION IN ELECTRICALLY PROPELLED VEHICLES

William Arthur Stevens, Maidstone, England, assignor to Guy Motors Limited, Fallings Park, Wolverhampton, England, a company of Great Britain Application August 6, 1931, Serial No. 555,590, and in Great Britain August 30, 1930

7 Claims. (Cl. 172—179)

This invention relates to the control of compound wound dynamo-electric machines of the kind used for the propulsion of vehicles and which will absorb electrical energy when acting as motors but will, when the vehicles are descending steep hills or are being retarded on the level, act as electric generators, and which when the electro-motive-force then set up, exceeds that of the current supply line or battery, can be used to return current to such source of current supply, hereinafter referred to as the current supply line.

The object of the present invention is to provide means alternative to those described in the specifications of prior British Patents Nos. 330,259 March 4, 1929, 338,259 September 9, 1929, and 341,679 December 19, 1929, granted to W. A. Stevens, the present applicant, whereby, when the dynamo-electric machine commences to act as a generator and the direction of current through the armature is reversed, the field strength of the machine will be such as to ensure that sufficient current shall be generated as will enable the machine to act effectively as a brake.

According to the present invention an electrically propelled vehicle equipped with a dynamo-electric machine of the kind herein referred to is characterized in that, when the machine is acting as a generator, the field maintained by the shunt winding is automatically augmented, either by means of a circuit alternative to the series winding and consisting of a number of turns wound on the latter and in an opposite direction thereto, said alternative circuit being arranged to be completed prior to or simultaneously with the breaking of the circuit of the series winding; or by reversing the series field, in which case the current traversing the series winding during regeneration or electric braking is automatically controlled by suitable shunting arrangements.

For this latter purpose each end of the series winding may be connected both with the armature and with the series resistance, each connection containing a Nodon valve, metal rectifier, contact switch or other circuit closing device arranged so that, whether the machine is motoring or generating, the current always passes through the series winding in the same direction. The invention also includes an arrangement of this kind in which when the machine is generating the current traverses a part only of the series winding.

Another method of reversing the series field consists in the provision of means for automatically reversing the terminals of the series winding so that, when regenerative or rheostatic braking is required, the field magnetism will be increased independently of the current direction through the armature.

The invention also includes, inter alia, an improved form of change-over switch by means of which contact is made on one side before it is broken on the other so that the main circuit is never broken, either when changing from one circuit to another or when reversing the terminals of the series winding.

There is also associated with the machine means whereby when the machine is about to commence motoring the change-over switches are moved to the motoring position before the electrical driving power is applied.

Provision is also made for rheostatic braking and in such a manner that the driving and braking circuits cannot both be completed at the same time.

A further feature of the invention consists in an arrangement whereby part of the driving shunt resistance can be utilized for braking purposes instead of providing a series of separate shunt resistances for this purpose.

In order to facilitate a clear understanding of the invention it is proposed to describe it as applied, by way of example, to the type of equipment described in British Patent No. 278,073 June 29, 1926 granted to W. A. Stevens aforesaid. It is to be understood, however, that the invention is equally applicable to any compound wound dynamo-electric machine which is of the regenerating type.

In the accompanying diagrams,

Figure 1 illustrates one method, included within the present invention, of augmenting the shunt field of a compound wound dynamo-electric machine, when acting as a generator.

Figure 1ª shows a modified arrangement in which the alternative circuit is connected across a circuit which includes the series resistance.

Figure 2 represents an alternative method in which contactors are used for effecting the change-over from motoring to generating conditions, and vice versa.

Figure 3 is a view similar to Figure 2 illustrating the use of a special change-over switch which makes contact on one side before breaking on the other side.

Figure 4 illustrates an arrangement in which a resistance can be automatically inserted in the lighting circuit when the machine is acting as a generator.

Figure 5 shows an alternative scheme for augmenting the field during regeneration by connecting the series winding in such a manner that the current always passes through it in one direction only.

Figure 6 represents a modification of the arrangement shown in Figure 5, a part only of the series winding being used when generating takes place.

Figure 7 is a further development of the arrangement illustrated in Figure 6 in which contactors are used in place of Nodon valves or the like.

Figure 8 illustrates a further alternative system in which the field is increased during regeneration by reversing the connections of the series winding in relation to the armature.

Figure 9 represents a development of the arrangement shown in Figure 8, in which the change-over switches are controlled by a low-tension battery.

Throughout the drawings like parts are designated by similar reference characters.

Referring to the drawings, 1 represents the armature of a compound wound dynamo-electric machine, 2 the series field winding, 3 the shunt field winding, 4 the variable series resistance, 5 the variable shunt resistance, 6 and 7 the positive and negative trolley poles and 8 current reversing switch mechanism of any approved type.

In the arrangement shown in Figure 1, the circuit alternative to the series field winding 2 and which carries the current from the armature 1 when the machine is acting as a generator, consists of a number of turns $2^a$ wound on the series field in such a direction as to augment the field maintained by the shunt winding 3 when regeneration is taking place. The main series winding 2 and the alternative winding $2^a$ are connected together at their ends remote from the lead from armature 1, and the main series winding 2 is connected to the lead from armature by way of a Nodon valve, metal rectifier, contactor switch or other circuit closing device 9 arranged so that the circuit through the winding 2 can only be made when the machine is motoring. The alternative series winding $2^a$ is also connected to the lead from armature 1 by means of a similar device $9^a$ arranged in this case so that the circuit through the winding $2^a$ can only be made when the machine is generating.

It will be obvious that the alternative circuit consisting of the winding $2^a$ may, as represented in Figure $1^a$, be connected across a circuit which includes the series resistance 4.

Where, as shown in Figure 2, the circuit closing devices take the form of contactors 10, $10^a$ they are arranged to be controlled so that only one circuit can be broken at a time, so as to avoid breaking the main circuit. For this purpose the said contactors are adapted to be opened against the action of springs by means of a two-way reverse current relay having two windings one 11 of which is in series with the main series field winding 2 and carries a current the direction of which varies according as the machine is acting as a motor or as a generator, whilst the other winding $11^a$ is in series or in shunt with the shunt field winding 3 or may be a high resistance coil across the supply mains 6 and 7, said winding $11^a$ in either case carrying a current which is unidirectional at all times. When therefore the machine is motoring the contactor 10 remains closed and the tongue $11^b$ of the relay makes contact with the fixed contact $11^d$ thereby closing the circuit of the exciting coil of the contactor $10^a$ which is thereby opened. When the machine commences to regenerate and the current through the relay coil 11 is reversed, the tongue $11^b$ breaks contact with the fixed contact $11^d$ and makes contact with the fixed contact $11^c$ thereby closing the circuit of the exciting coil of contactor 10 which is thus opened and allowing contactor $10^a$ to close so as to place the alternative winding $2^a$ in circuit with the armature. The reverse current relay may, however, be of any other type in which one contact is made when the current through the armature is in one direction and the other contact is made when the current through the armature is in the other direction. For example, instead of using two separate contactors to effect the change-over from motoring to generating conditions and to ensure continuity of the main circuit at such times, a two-way switch may be employed adapted to make contact on one side before it is broken on the other. Such a switch is shown in Figure 3 comprising a pair of spring arms 12, $12^a$ each carrying a contact and both carried by a rocking arm adapted to be operated against the action of a spring 13 by means of an electro-magnet excited by a circuit closed by a polarized reverse current relay 11, $11^a$, $11^b$ having one contact $11^c$ only. In this case the switch is normally held by the spring 13 in a position in which the series winding 2 is in circuit with the armature 1. When, however, the machine commences to regenerate the tongue $11^b$ of the relay closes its circuit thereby energizing the exciting coil $11^e$ of the electromagnet to draw the switch over against the action of the spring. By reason of the elasticity of the spring arms 12, $12^a$ the alternative series winding $2^a$ is placed in circuit with the armature 1 of the dynamo-electric machine before the circuit of the main series winding 2 is broken, and vice versa. By this means the risk of breaking the main circuit is avoided.

In both Figs. 2 and 3 the tongue $11^b$ of the reverse current relay is electrically connected by a wire $11'$ to one terminal of the machine 1, while the coils of contacts 10 and $10^a$ are selectively electrically connected across the terminals of the machine 1 by means of the tongue $11^b$.

In each of these cases a separate switch can be used to insert a resistance across the lighting circuit when the machine commences to act as a generator. This switch 14 may, as shown in Figure 4, be automatically operated by means of a polarized contactor controlled by a reverse current relay the heavy winding $14^a$ of which is in series with the series winding whilst the fine winding $14^b$ is in series or in shunt with the shunt winding of the dynamo-electric machine. When the machine is motoring this switch closes its circuit but when the machine commences to act as a generator and the current through the winding $14^a$ of the polarized contactor is reversed the switch arm is opened by a spring thus breaking the relay circuit and introducing a resistance 15 into the lamp circuit 16.

Figure 5 shows another method of strengthening the field maintained by the shunt winding during regeneration. According to this arrangement the current passing through the series winding, instead of being reversed, always flows in one direction. As will be seen, each end of the series winding 2 is connected both to the armature 1 and to the series resistance 4 and in each connecting branch a Nodon valve, metal rectifier contact switch or other circuit closing device 17 is so arranged that when the machine is motoring the current flows through the branch 18, along the series winding 2 from left to right hand and thence by way of the branch 18ª to armature 1. When regeneration takes place the current flows from armature 1 through branch 18ᵇ along the series winding 2, again from left to right, and thence to series resistance 4 by way of branch 18ᶜ.

If desired the current passing from the armature during regeneration may be caused to traverse a part only of the series winding. For this purpose, as shown in Figure 6, the branch 18ᵇ, which permits the passage of the regenerated current, instead of being connected to one end of the series winding 2, is connected to a position on the said winding so that, when the machine is regenerating, only part of the series winding will be available for strengthening the field. Where contactor switches are used instead of Nodon valves or metal rectifiers they may be controlled by means of a two-way reverse current relay. Such an arrangement is shown in Figure 7 where it will be seen that the linked contactor switches 19, 19ª, 20, 20ª are normally kept closed by means of springs and each pair is opened by the action of an electro-magnet so that only one pair can be opened at a time. When the machine is acting as a motor the left-hand pair of contactors 19, 19ª remain closed but the right-hand pair is opened by the action of the reverse current relay 21 the switch arm 22 of which makes contact with the fixed contact 22ª. Conversely, when the machine is acting as a generator and the current through the heavy winding of the relay is reversed the switch arm 22 of the relay makes contact with the fixed contact 22ᵇ thus completing the relay circuit containing the exciting coil of the electro-magnet operating the left-hand pair of contactors 19, 19ª which is then opened, but not until the relay circuit which controls the right-hand pair of contactors is broken. The tongue 22 is electrically connected to one terminal of the machine 1 by a wire 22'.

Figure 8 shows an alternative arrangement in which for the purpose of increasing the field magnetism of the dynamo-electric machine during regenerative or rheostatic braking, the terminals of the series field winding in relation to the armature are automatically reversed.

For this purpose the ends of the series winding 2 are respectively connected to the switch arms 23, 23ª of two two-way contactor switches, the arrangement thus being that of a double pole two-way switch. The contacts are kept closed on one side during braking operations as shown by the action of springs and on the other side during motoring by means of electro-magnets, one for each switch, the circuits of the exciting coils 24, 24ª of which are closed between the positive and negative trolley poles 6, 7, by means of a polarized reverse current relay 25 having two windings one 25ª of which is in series with the armature and carries a current the direction of which varies according as the machine is acting as a motor or as a generator, whilst the other winding 25ᵇ is connected in series or in shunt with the shunt field winding 3 or may be a high resistance coil across the supply mains. The reverse current relay 25 is arranged so that it will close its circuit when the machine is acting as a motor and open its circuit when the machine is acting as a generator.

It will be seen that with this arrangement the reversal of the series winding will be made at the time the machine is generating or receiving but little current and therefore this reversal will be made with no accompanying shock to the machine or to the transmission.

To prevent the breaking of the main circuit at the instant of changing over of the double-pole two-way contactor, a shunt 26 may be connected between the armature 1 and the series resistance 4 so as to bridge the said contactor 23, 23ª and thereby ensure that there shall be only a small difference of potential across the contacts at the time of change-over.

One winding of the reverse current relay 25, or of other regulating apparatus required, such as a reverse current contactor 27 for removing a short-circuit over a resistance 28 in the lighting circuit 29 when regeneration is taking place, may be connected across this shunt, which may be of relatively high resistance, say one to four ohms; or the windings of the regulating apparatus may be used as a shunt without any further resistance in parallel.

As an alternative to the use of the shunt 26 the change-over switches may be of the type already described with reference to Figure 3, that is to say, they may each comprise a pair of spring arms carried by a rocking arm so that contact is made on one side before it is broken on the other, thus ensuring that the circuit through the series winding is never broken.

A variable shunting resistance 30. ranging from a short-circuit to infinity and adapted for operation by a brake pedal, is connected between the series resistance 4 and the switch arm of the two-way switch 23ª. This switch arm is also connected to one end of the series winding 2. When the machine is motoring this resistance 30 is short-circuited, and inoperative, but when the machine is generating, it is connected in parallel with the series winding 2, so that by the depression of the aforesaid brake pedal the current through the series winding can be varied from practically zero to maximum, thus providing for a large range of additional excitation to the field which is already excited by the shunt winding 3. Whilst the machine is regenerating the brake pedal need not be used, as a fixed shunt 31 in series with the variable shunt will be all that is necessary.

So far the invention has been described with reference only to regenerative effects in which current is returned to the line. Below the speed at which the machine is able to generate at a voltage above that of supply, regeneration cannot take place and it will be necessary to close the circuit of the machine through a resistance if electric braking at low speeds is required.

As shown in Figure 8 the rheostatic braking circuit starts from the brush of armature 1 connected to the negative trolley pole 7 through a contactor switch 32 which is held in an open position against the pull of gravity by the action of an electro-magnet the exciting coil 33 of which is connected between the positive and negative mains, the exciting circuit being made and broken by means of a contact 34 on the braking controller drum. From this contactor 32 the circuit is carried through a switch 35 linked to the contactor 36 which makes the first contact to the starting resistance 4, this switch closing practically at the same time as the contactor to which it is linked, opens. From the linked switch the circuit is carried to a suitable position on the starting resistance 4, thus, when both switches 32 and 35 are closed, completing the main braking circuit. The shunt circuit of the machine is completed at the same time by means of a small switch 37 linked to and closing at the same time as the contactor 32.

With this arrangement it will be seen that the driving circuit and the rheostatic braking circuit cannot possibly be closed at the same time and that the rheostatic braking circuit cannot itself be closed until the exciting circuit of the contactor 32 between the linked switch 35 and the negative armature brush is broken by the action of the braking controller. The position of the rheostatic brake pedal is arranged so that it must be depressed by the same foot which operates the driving pedal, so that only one pedal can be depressed at a time.

When, as shown, the power pedal is in its "off" position the linked switch 35 is closed, but the rheostatic braking circuit is broken by the contactor 32 which has its electro-magnet excited by a circuit which is maintained between two fingers 39, 41 on the insulated contact 34 aforesaid on the braking controller.

When this braking controller is in its "off" position a narrow portion 34ª of the contact 34 electrically connects switch fingers 38, 39 thereby maintaining the exciting circuit of the driving contactors. On the first forward movement of the braking pedal this narrow portion of contact 34 is removed from switch finger 38 thereby breaking the exciting circuit of the driving contactors and of any holding-on device such as 40 connected to them.

A further movement of the braking controller will remove the contact 34 from switch fingers 39, 41 thus breaking the exciting circuit of the electro-magnet holding open the contactor 32 which will then close under the action of gravity. This will complete the main rheostatic braking circuit (linked switch 35 being also closed) and the small linked switch 37 which closes at the same time, will complete the shunt field circuit through a series of resistances which will be successively short-circuited, on a still further movement of the braking controller, by an insulated contact piece 42 carried on the drum of said braking controller. The said series of resistances may conveniently form part of the shunt resistance 5, the contact segment 43 on the governing controller being suitably cut away for this purpose as shown.

Moderate electric braking will commence immediately the circuit of the armature is made through the series resistance 4, that is, immediately contactor 32 closes. The braking effort will then increase as the shunt resistance is gradually short-circuited by the contact 42.

The shunt circuit, instead of being closed by the small switch 37, as already described, may be completed by an insulated sliding contact on the braking controller drum which will keep the said circuit closed during all further forward movement of the braking pedal. A further forward movement of the braking pedal will gradually remove the shunt resistance 30 from the series winding 2 until the shunt is entirely removed, producing powerful electric braking down to quite low speeds. In the event of a trolley pole coming off the line electric braking will still be effective as it will be maintained by the field set up by the series winding. The shunt winding 3 will also be excited across the armature by way of the non-inductive high resistance 45 placed across the switch 36 which together with the switch 46 closes the circuit from positive pole to the starting end of the series resistance 4.

The said resistance 45 will act as a shunt to the shunt winding 3 when the current is broken by the return of the electric brake pedal to its "off" position.

As a safeguard against excessive braking should the driver, in case of emergency, depress the brake pedal suddenly to its full extent when the vehicle is travelling at speed, a safety device is provided consisting of a suitable shunt 47 connected across the series winding 2. The circuit of this shunt is adapted to be broken by means of a switch arm 48 which is normally held open by a spring. A soft iron armature on this switch arm is attracted by an electro-magnet having its winding 49 in series, either with the braking circuit as shown, the main circuit, or in shunt or series with the fixed shunting resistance already described. An excess of current will close this switch, thus introducing a shunt across the series field, which will remain in until the conditions causing the overload have been modified by the slowing down of the vehicle.

The contactors 36, 46 which provide for the connections for motoring may be arranged, as shown, to be closed successively by the operation of the governing controller so that the shunt winding can be fully excited by the closing of contactor 46 in advance of contactor 36 which latter completes the connection from the positive trolley pole to the end of the series resistance 4. For this purpose an additional finger 50 may be provided on the governing controller which will make circuit with an extension 51 of the drum and close the circuit of the exciting coil 46ª of the first contactor 46. At the same time a narrow contact 52 on the governing controller makes contact on the positive side with two switch fingers 53, 54, respectively connected with contactor 46 and the bottom contact of the reverse current relay 25. This closes the circuit of the exciting coils 24, 24ª of the electro-magnets which move the change-over switches 23, 23ª to the driving position. As the power pedal is further depressed this exciting circuit is broken as it will not be required when the said circuit is maintained by the polarized reverse current relay 25. The further depression of the power pedal also operates to close the contactor 36 thus completing the main circuit to the series resistance 4. When the machine is regenerating the tongue of the relay completes the circuit of the hold-on magnet winding 40 and of the contactor 27 controlling the lighting resistance 28.

The form of switching for reversing the series winding is only given as an example. Any other form of switching or the use of Nodon valves or metal rectifiers in the place of the double pole two-way switch can be used without departing from the nature of this invention.

The application of the invention to a series wound machine is substantially the same as above described except that instead of using a polarized relay the change-over switches 23, 23ª are operated by closing and maintaining the circuit from the drum to the above mentioned finger 54 during the whole of the traverse of the power pedal. Alternatively, the said switches can be closed mechanically by the first movement of the power pedal and maintained closed throughout the remainder of the traverse.

The present invention also includes the arrangement shown in Figure 9 in which the two two-way contactor switches 23, 23a, which automatically change over the connections of the series winding 2 so as to strengthen the field during regeneration and rheostatic braking, can, alternatively, be operated by electro-magnets excited from a small low-tension battery 60 carried on the vehicle. The exciting circuit is made by way of the tongue 61 of a single contact polarized reverse current relay having one winding in series with the armature circuit and the other winding in series with the shunt circuit and which closes its contacts when the machine is acting as a generator. The said tongue 61 is electrically connected to the positive terminal of the small battery and the circuit completed through the electro-magnet windings 24, 24a, which may be in parallel or series, to the negative pole of the small battery. With this arrangement the modification of the braking controller described with reference to Figure 8 will be as follows:—

Instead of the circuit to the exciting coil 33 of the linked contactors 32, 37, which complete the circuit of the armature 1 with its series winding 2 and also the shunt circuit (which exciting coil 33 opens the switches when it is carrying current) to a position on the series resistance 4 for braking purposes, these contactors 32, 37 can be excited by an electro-magnet having a low resistance winding 62, which closes the switches when it is carrying current and is fed by a circuit from the positive terminal of the small battery to a contact finger 63 on the braking controller, the circuit to a second contact finger 64 being maintained, throughout the further traverse of the electric braking pedal, by a sliding contact piece 65, carried on and insulated from the braking controller shaft. This sliding contact completes the circuit between the said fingers immediately after the circuit between the two switch fingers 38, 39 which maintain the exciting circuit of the driving contactors is broken by the removal of the narrow contact 34 immediately the electric braking pedal is depressed, as above described with reference to Figure 8.

From the second contact finger 64 the battery circuit is carried through the low resistance magnet coil 62 of the linked braking contactors 32, 37, then through a switch 35 linked to the contactor 36 which breaks the circuit from overhead supply to the end of series resistance 4 when the driving pedal is in its "off" position, or the exciting circuit of the driving contactors is broken by the action of the braking pedal. This switch 35 is closed when the contactor 36 is open and opens when the contactor 36 is closed, so that it will be impossible to apply rheostatic electric braking until the driving circuit is broken either by bringing the driving pedal to "off" position or by breaking the exciting circuit of the driving contactors by the action of the braking pedal, as in Figure 8.

For the purpose of ensuring that the change-over switches 23, 23a shall maintain the circuit through the series winding 2 in such a direction that the current will strengthen the field for braking purposes, in the event of a trolley wheel being de-wired, in which case the polarized reverse current relay 61 would be inoperative owing to the failure of the shunt current through its winding, there is provided, on the braking controller, a third finger 66 which will be brought into contact with the long sliding contact piece 65, already mentioned, at the same time as the circuit to the electro-magnet coil 62 of the braking contactors is completed.

This third finger, which will remain excited from the positive pole of the battery 60 during the remainder of the traverse of the electric braking pedal, will complete a circuit to the fixed contact 67 of the polarized reverse current relay and independently excite the coils 24, 24a of the electro-magnets of the change-over switches so that they will close in such a direction that the current through the series winding will cause the machine to generate and, as its circuit is completed through part of the series resistance, enable it to act as a powerful rheostat brake.

The remainder of the braking controller will remain as described with reference to Figure 8.

I claim:—

1. In electrically propelled vehicles, a dynamo-electric machine having series and shunt field windings, a source of current supply, a reverse current device, a double pole two-way contactor adapted, when the counter electro-motive force of the machine exceeds that of the current supply, to be actuated by said reverse current device to reverse the terminals of the series winding, and means whereby, in the event of the current supply being broken, the double pole two-way contactor is caused to maintain the current through the series winding in a direction to strengthen the field for braking purposes.

2. In an electrically propelled vehicle, a dynamo-electric machine having an armature, a shunt field winding and a series field winding, a source of power supply, a multi-positioned controller adapted to connect said machine to said source and affect the acceleration thereof, a reverse current relay associated with said armature circuit and said shunt field circuit, reversing means for said series field winding disposed for operation to one position by said relay in response to the direction of the current in said armature when the machine is acting as a motor, a second multi-positioned controller adapted upon the operation thereof to render said first mentioned controller inoperative and to establish a braking circuit for said machine, said second mentioned controller rendering said relay inoperative and means for moving said reversing means to an opposite position upon the operation of said second mentioned controller.

3. In an electrically propelled vehicle, a dynamo-electric machine having an armature, a shunt field winding and a series field winding, a source of current supply, reversing means for said series field winding, a multi-positioned controller adapted upon the initial movement thereof to move said reversing means to one position, said controller adapted upon further movement to connect said machine to said source and affect the acceleration thereof, means responsive to the direction of the current in said armature disposed to maintain said reversing means in said position while the machine is acting as a motor and means for moving said reversing means to an opposite position when the machine is acting as a generator.

4. In an electrically propelled vehicle, a dynamo-electric machine having an armature, a shunt field winding and a series field winding, a source of current supply, means to connect said machine to said supply and to affect the acceleration thereof, a reverse current device, a reversing switch associated with the terminals of said series field winding and adapted to connect said series field winding in series relation with said armature said reversing switch being responsive to the direction of the current in said armature when the machine is acting as a motor, means adapted upon the operation thereof to render said first mentioned means and said reverse current device inoperative, and means operable upon the failure of said current supply to move said switch to a different position and thereby reverse said series field connections.

5. In an electrically propelled vehicle, a dynamo-electric machine having an armature, a shunt field winding and a series field winding, a source of power, a multi-positioned controller adapted to connect said machine to said source and to affect the acceleration thereof, a reversing switch adapted to connect said series field winding in series relation with said armature, a reverse current relay influencing said reversing switch to a position to connect said series field in such a manner as to augment said shunt field winding while the machine is acting as a motor, a braking controller adapted upon the initial operation thereof to render said relay and said first mentioned controller inoperative, means operable upon the actuation of said braking controller for moving said reversing switch to a reversed position and means operable upon further movement of said braking controller for varying the current through said series field.

6. In an electrically propelled vehicle a dynamo-electric machine having an armature, a shunt field winding and a series field winding, a source of current supply, reversing means for said series field winding normally biased in one position to connect said series field winding in series relation with said armature, means responsive to the direction of the current in said armature disposed to move said reversing means to an opposite position and thereby connect said series field in a reversed series relation with said armature said biasing means being operable upon the failure of said current supply to move said reversing means to said first mentioned position.

7. In an electrically propelled vehicle, a dynamo-electric machine having an armature, a series field winding and a shunt field winding, a source of current supply, a multi-positioned controller adapted upon operation thereof to connect said machine to said source and to effect acceleration thereof, a reversing switch associated with the terminals of said series field winding, automatic means adapted to move said reversing switch to one position when said machine is acting as a generator, means associated with said first mentioned controller adapted to move said reversing switch to an opposite position before power is supplied to said machine.

WILLIAM ARTHUR STEVENS.